United States Patent
Jiang et al.

(10) Patent No.: US 9,912,463 B2
(45) Date of Patent: Mar. 6, 2018

(54) FULL DUPLEX TRANSMISSION SETUP AND RELEASE MECHANISM

(71) Applicant: ZTE Corporation, Shenzhen (CN)

(72) Inventors: Anming Jiang, Shenzhen (CN); Bo Sun, Shenzhen (CN); Nan Li, Shenzhen (CN); Yonggang Fang, San Diego, CA (US)

(73) Assignee: ZTE Corporation, Shenzhen (CN)

( * ) Notice: Subject to any disclaimer, the term of this patent is extended or adjusted under 35 U.S.C. 154(b) by 33 days.

(21) Appl. No.: 14/569,708

(22) Filed: Dec. 13, 2014

(65) Prior Publication Data

US 2015/0172038 A1    Jun. 18, 2015

(30) Foreign Application Priority Data

Dec. 13, 2013  (WO) ................. PCT/CN2013/089412

(51) Int. Cl.
*H04J 3/24* (2006.01)
*H04L 29/06* (2006.01)
*H04M 11/06* (2006.01)
*H04L 5/14* (2006.01)
*H04L 5/16* (2006.01)
(Continued)

(52) U.S. Cl.
CPC ............. *H04L 5/143* (2013.01); *H04L 5/16* (2013.01); *H04L 27/0006* (2013.01); *H04L 5/0007* (2013.01); *H04L 5/1492* (2013.01)

(58) Field of Classification Search
CPC ....... H04L 12/413; H04L 1/0026; H04L 5/14; H04L 27/0006; H04L 5/0007; H04L 5/1492; H04L 5/16; H04L 5/143; H04J 3/24; H04W 72/04; H04W 28/18; H04W 84/12

USPC ......................................................... 370/280
See application file for complete search history.

(56) References Cited

U.S. PATENT DOCUMENTS 7,860,133 B2 * 12/2010 Salter ................... H04M 11/066
370/522
2002/0071448 A1 * 6/2002 Cervello ........... H04W 74/0816
370/445
(Continued)

FOREIGN PATENT DOCUMENTS

CN       101137229 A    3/2008
CN       102355507 A    2/2012
WO    2013/179270 A1   12/2013

OTHER PUBLICATIONS

He, F., et al., "A Study on Self-jammer Cancellation in Passive RFID System," Modern Radar, 35(5):67-75, May 2013 (no translation available).

(Continued)

*Primary Examiner* — Edan Orgad
*Assistant Examiner* — Vanneilian Lalchinthang
(74) *Attorney, Agent, or Firm* — Perkins Coie LLP

(57) ABSTRACT

In a wireless network, full duplex communication is established using a half-duplex mechanism. During a full duplex communication opportunity, a first quantum of data is transmitted from a first station to a second station and a second quantum of data is received by the first station from the second station. The full duplex transmission opportunity is implicitly or explicitly established and ended using a transmission mechanism understood by half duplex wireless stations.

24 Claims, 14 Drawing Sheets

(51) Int. Cl.
*H04L 27/00* (2006.01)
*H04L 5/00* (2006.01)

(56) References Cited

U.S. PATENT DOCUMENTS

| | | | | |
|---|---|---|---|---|
| 2003/0198238 | A1* | 10/2003 | Westby | H04L 49/90 370/402 |
| 2005/0058151 | A1 | 3/2005 | Yeh | |
| 2005/0141545 | A1 | 6/2005 | Fein et al. | |
| 2007/0274297 | A1* | 11/2007 | Cross, Jr. | G10L 15/22 370/356 |
| 2008/0147923 | A1* | 6/2008 | Renahy | G06F 13/4059 710/62 |
| 2009/0086706 | A1* | 4/2009 | Huang | H04L 1/0026 370/349 |
| 2011/0310834 | A1* | 12/2011 | Seok | H04W 72/0446 370/329 |
| 2012/0051338 | A1 | 3/2012 | Seok | |
| 2013/0208708 | A1 | 8/2013 | Nezou et al. | |
| 2014/0016516 | A1* | 1/2014 | Aggarwal | H04L 5/143 370/278 |
| 2014/0078940 | A1* | 3/2014 | Aggarwal | H04L 1/1854 370/278 |
| 2014/0169233 | A1* | 6/2014 | Aggarwal | H04W 74/08 370/277 |
| 2014/0195366 | A1* | 7/2014 | McKnight | G06Q 30/08 705/26.3 |
| 2014/0237585 | A1* | 8/2014 | Khan | H04L 63/16 726/15 |
| 2015/0016309 | A1 | 1/2015 | Fang et al. | |
| 2016/0128097 | A1* | 5/2016 | Pajukoski | H04L 5/0055 370/336 |

OTHER PUBLICATIONS

Sahai, A., et al., "Pushing the limits of Full-duplex: Design and Real-time Implementation," eprint arXiv:1107.0607, pp. 1-12, Jul. 2011.

Chinese Office Action dated Mar. 1, 2017 for Chinese Application No. 201410337262.7, filed Jul. 15, 2014, no translation available (15 pages).

Chinese Office Action dated Oct. 23, 2017 for Chinese Application No. 201410776054.7, filed Dec. 15, 2014, no translation available (8 pages).

* cited by examiner

FULL DUPLEX TRANSMISSION SETUP AND RELEASE MECHANISM

CROSS REFERENCE TO RELATED APPLICATIONS

This document claims the benefit of priority under 35 U.S.C. § 119(a) and the Paris Convention of International Patent Application No. PCT/CN2013/089412, filed on Dec. 13, 2013. The entire content of the before-mentioned patent application is incorporated by reference herein.

BACKGROUND

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) mode or in different frequency via frequency division duplexing (FDD) mode.

IEEE 802.11 is an asynchronous time division duplexing technology designated for wireless local area network (WLAN). The basic unit of WLAN is a basic service set (BSS). The infrastructure BSS is the BSS with stations associating with an Access Point (AP) to connect to the wired network or Internet. In a BSS, both access point and stations share the same frequency channel via using CSMA/CA technology, a kind of TDD mechanism, for multiple access and data transmission.

SUMMARY

This document describes technologies, among other things, for establishing and releasing full-duplex transmission in the shared environment with half-duplex stations on license-exempt frequency bands.

In one aspect, a method is provided to use CSMA/CA mechanism for full-duplex stations to contend the medium together with legacy half-duplex stations so as to make both types stations co-existence in the same frequency channel of license-exempt bands.

In another aspect, a method is provided to establish full-duplex transmission opportunity (FDOP) using half-duplex transmission mechanism (FDOP request, FDOP response, or FDOP confirmation frame) before starting the full-duplex transmission. In this way, third party stations would be able to aware of the medium usage. The FDOP contention frame such as FDOP Request for setup FDOP includes full-duplex capability information to request the medium occupancy for full-duplex transmission. The FDOP response frame includes full-duplex capability indication that confirms the acquisition for following FDOP. The FDOP confirmation frame may be used for the case that the FDOP duration is longer than the original transmission duration requested by the FDOP initiator.

In addition in another aspect, a method is provided to estimate the duration of FDOP used for two-ways simultaneous transmissions and to notify all the other stations during FDOP setup. The FDOP duration estimation is based on the transmission duration of data frames estimated by full-duplex stations in FDOP.

In another aspect, a method is provided to protect the third party stations from false contending the FDOP via clear channel assessment (CCA) dual correlated energy detection mechanism.

In yet another aspect, a method is provided for full-duplex station to release FDOP.

The details of the above aspects and their implementations are set forth in the accompanying drawings, the description and the claims.

DETAILED DESCRIPTION

This document describes techniques, mechanisms, devices, and systems for establishing and releasing full-duplex connections for simultaneous downlink (DL) and uplink (UL) transmissions over single frequency channel in shared wireless environments with other contention based wireless devices.

Existing wireless transmission mechanism is the half duplex transmission link even the communication systems emulate full duplex communications via Time Division Duplexing (TDD) or Frequency Division Duplexing (FDD). In a half-duplex system operating on single frequency channel, two communicating stations cannot transmit downlink and uplink signals at same time over the same frequency channel because the transmitting signal significantly interfere the receiver's noise figure and sensitivity which makes the receiver of wireless station not work properly. Therefore the current wireless communication systems have to separate the transmitting path from receiving path either in different frequency (FDD) or in different time (TDD) so that the receiver of wireless station would not be interfered by its transmitting signals.

In an FDD system, the DL and UL radio frequencies have to be separated enough for analog or digital filters in a transmitting/receiving device to suppress the out-band inference to a certain level. For TDD system, the DL and UL transmissions have to be separated by a Guard Interval (GI) in time domain, i.e. two communicating stations transmit signal alternately without overlapping in the time domain. Therefore no matter radio signals are transmitted in FDD or TDD, transmission resources such as time or the radio spectrum cannot be fully utilized. In TDD system, the more switching times between DL and UL transmissions, the less medium utilization efficiency.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
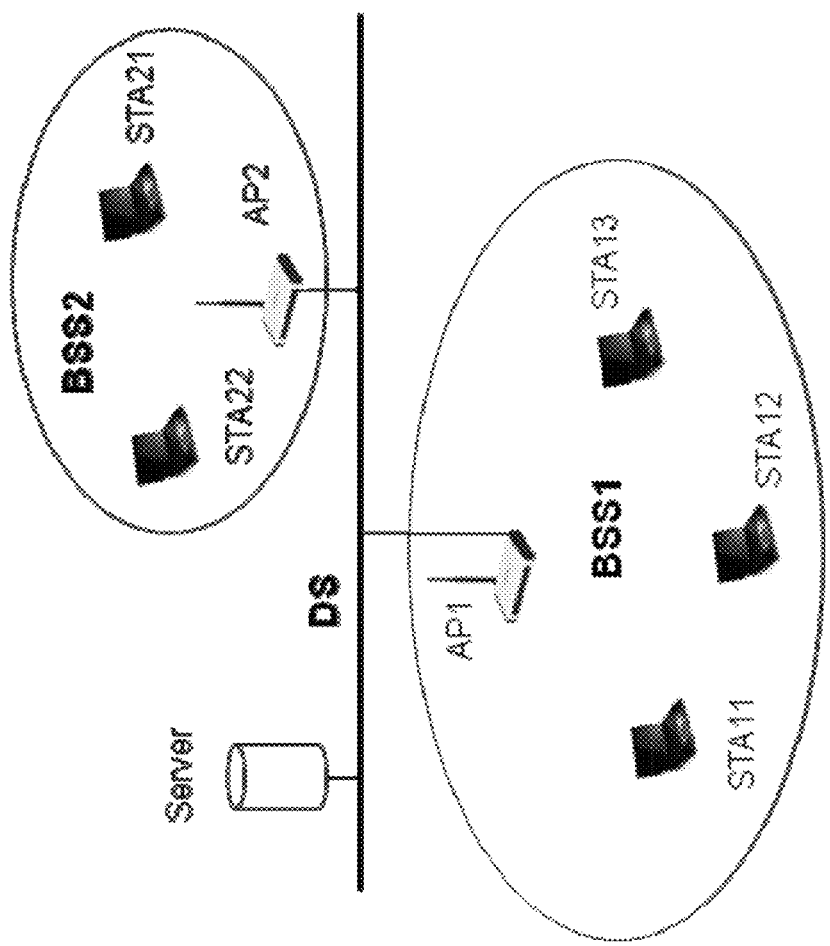
FIG. 1 shows an example of infrastructure BSS in a wireless communication system.

A central station being associated with other stations and dedicated to manage the BSS is referred to an Access Point (AP). A BSS built around an AP is called an infrastructure BSS. FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server through a distribution system (DS).

IEEE 802.11 wireless communications support multiple access and provides two types of access control mechanisms for multiple stations to access the medium:

A) Distributed Coordination Function (DCF)

B) Point Coordination Function (PCF).

PCF (or its enhanced version HCCA) is a centrally controlled multiple Media Access Control (MAC) mechanism used in IEEE 802.11 based WLANs. PCF resides in an AP to coordinate the communication within the WLAN. The AP contends the medium in a PCF inter frame space (PIFS) time after the medium is sensed in idle. With higher priority than DCF, the AP can occupy the medium earlier than non-AP stations and send a CF-Poll frame to the PCF capable stations to permit it to transmit a frame over the medium. If the polled station does not have any frames to send, it may transmit null frame to the AP. Otherwise, the polled station will take the transmission opportunity to send its data to the AP over the medium.

Since PCF (or HCCA) uses polling mechanism for multiple access control, i.e. it alternatively polls all the associated stations to check whether they have buffered data to send, it may encounter channel efficiency issues when there are a large number of associated stations such as in a hotspot of public area or conference room. When the number of associated stations is large, but less number of active stations, PCF polling mechanism is not very efficient and causes a lot of time waste on the medium.

DCF, on the other hand, relies on the carrier sensing multiple access with collision avoidance (CSMA/CA) mechanism to control the multiple medium access. Each station implements a CSMA/CA function. Before access to the wireless medium, a station has to sense the medium occupancy using CSMA/CA. If the station senses the medium is busy, it has to wait and retry sensing the medium in later time. If the station senses the medium in idle, it will contend the medium in the inter frame space (IFS) time. In order to reduce the probability of collisions when multiple stations access the medium at same time, CSMA/CA forces each station to backoff a random time before transmitting over the medium.

However, the existing CSMA/CA mechanism can be very inefficient due to overhead in each transmission and thus may have reduced medium utilization efficiency especially when a large number of stations share the same medium.

Figure 2:
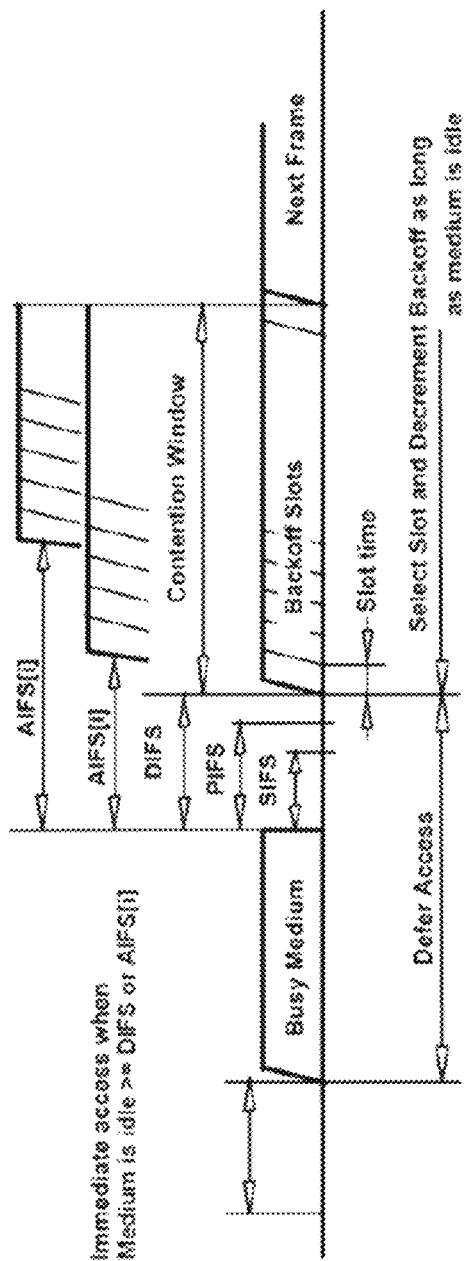
FIG. 2 shows an example of transmission overhead in DCF used in IEEE 802.11.

FIG. 2 shows an example of transmission overhead in CSMA/CA mechanism of IEEE 802.11. Along the timeline proceeding from the left of the figure to right, a station senses the medium. If the medium is busy, the station may defer until the medium is determined as idle plus a period of time equal to xIFS when the last frame detected on the medium was received correctly. If the station is going to send a control frame such as ACK, then it has to wait for short interframe space (SIFS) time before transmission. If the station is going to transmit a management frame, it has to wait for the point coordination function (PCF) interframe space (PIFS). If the station is going to transmit the data frame, it has to wait for distributed (coordination function) interframe space (DIFS) or arbitration interframe space (AIFS) or enhanced interframe space (EIFS) before entering contention window.

In order to allow multiple stations to contend the medium, the DCF CSMA/CA mechanism uses the backoff time control mechanism in the contention window after waiting for xIFS period. Each station in the contention window has to backoff a random time which is defined as $$\text{backoff Time} = \text{Random}(\ ) \times a\text{SlotTime} \qquad \text{Eq. (1)}$$

where Random( )=Pseudorandom integer uniformly distributed over the interval [0, CW], and CW is an integer:

$$a\text{CWmin} \leq \text{CW} \leq a\text{CWmax}. \qquad \text{Eq. (2)}$$

As noted herein, the existing CSMA/CA mechanism used in IEEE 802.11 has major concern on overhead in each transmission and medium utilization efficiency especially when a large number of stations share the same medium and transmit simultaneously.

In a contention interval, the AIFS and contention window for backoff (CW) are the overhead to the user data transmission. In TXOP period, RTS/CTS, ACK, preamble and the time interval (SIFS) between the DL and UL transmission are the overhead to user data transmissions. Those overheads could reduce the transmission efficiency.

In some embodiments, a full-duplex transmission can be implemented to improve the medium utilization efficiency and/or to reduce the transmission latency and/or to improve user experience. In some embodiments, a disclosed technique divides the medium occupancy time into contention period and transmission period so that it could make the full-duplex transmission mechanism to be able to co-exist with legacy CSMA/CA based half-duplex transmission mechanism. This patent document is to provide further detail of mechanism for full-duplex transmission opportunity (FDOP) setup and release.

In some embodiments, full-duplex capable stations and legacy CSMA/CA based stations are allowed to contend the medium at the same time based on clear channel assessment (CCA) detection mechanism: when those types of stations detect the medium in idle according to CCA level, they can enter contention period after certain backoff time. If full-duplex capable stations acquire full-duplex transmission opportunity (FDOP), the communicating full-duplex capable stations can start the full-duplex transmission, and other stations lose the transmission opportunity in this contention.

Figure 3:
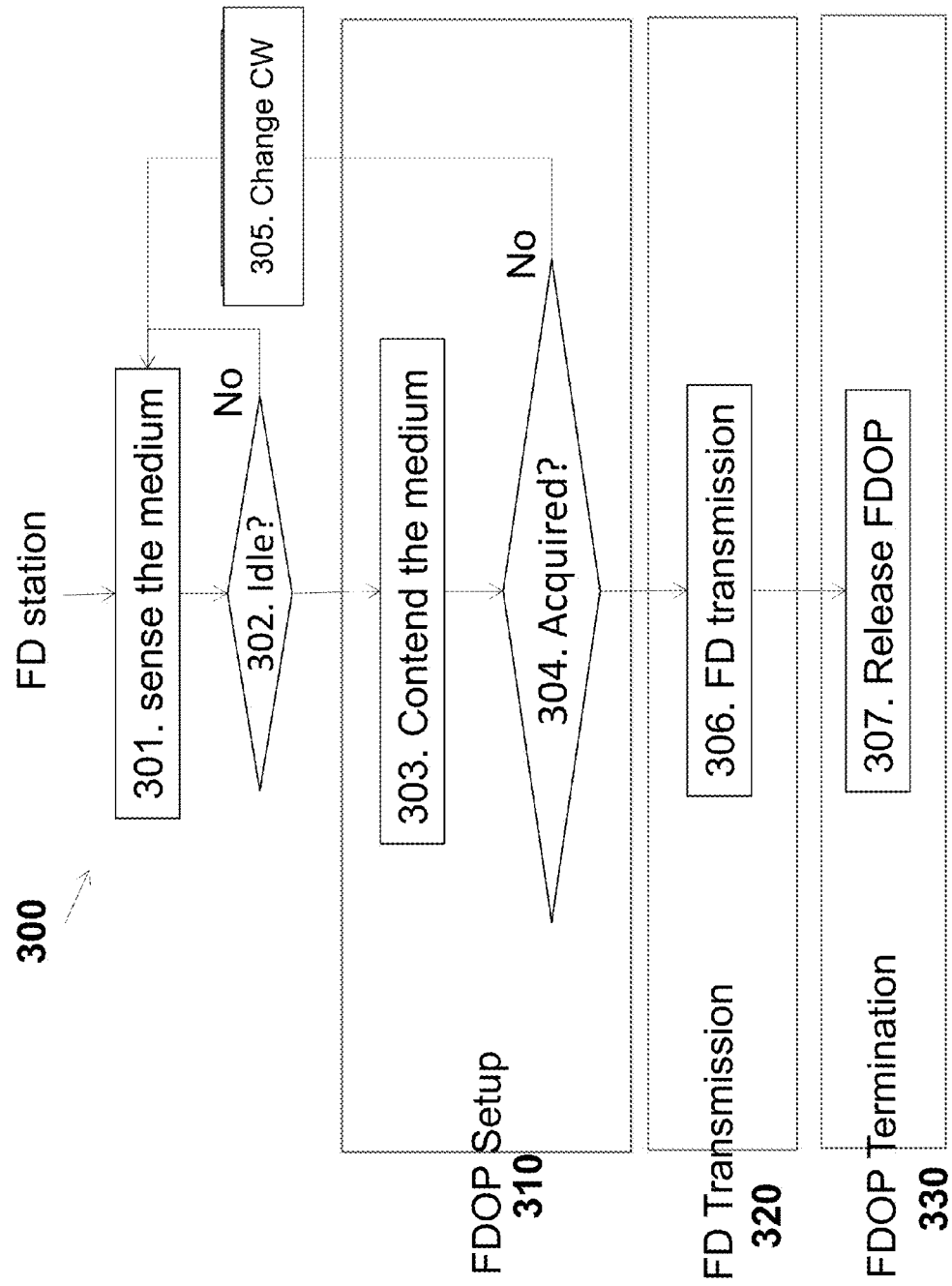
FIG. 3 is a flowchart representation of an exemplary method of full duplex opportunity (FDOP) operation of a wireless device.

FIG. 3 depicts a flowchart of an example of full-duplex station requesting for FDOP procedure 300.

The procedure 300 can be conceptually considered to have three phases, as shown in FIG. 3.

1) FDOP setup (310): a full-duplex station contends the medium and receives the confirmation for acquired FDOP.

2) FD transmission (320): two full-duplex stations transmit data frames in two-ways simultaneously in the FDOP.

3) FDOP Termination (330): when finishing the data transmissions, full-duplex stations release the medium for next contention.

At 301, medium is sensed. If a determination is made (302) that the medium is not idle, the sensing of the medium is conducted periodically performed. When the medium is sensed idle, at 303, the station performs backoff and then contends the medium. If the medium cannot be acquired (304), the station may increase the size of contention window to have longer backoff time (305) in the next contention. When the medium is acquired, a full duplex transmission may be initiated (306). After full duplex transmission is performed, the full duplex transmission opportunity may be released back, either implicitly or explicitly, as described in the present document.

In one aspect, the procedure 300 uses a half-duplex scheme to establish full-duplex communication. In one beneficial aspect, in a network comprising legacy networks that only follow a half-duplex transmission mechanism, the use of half-duplex communication to establish a full-duplex communication can be beneficial in providing backward compatibility.

Figure 4A:
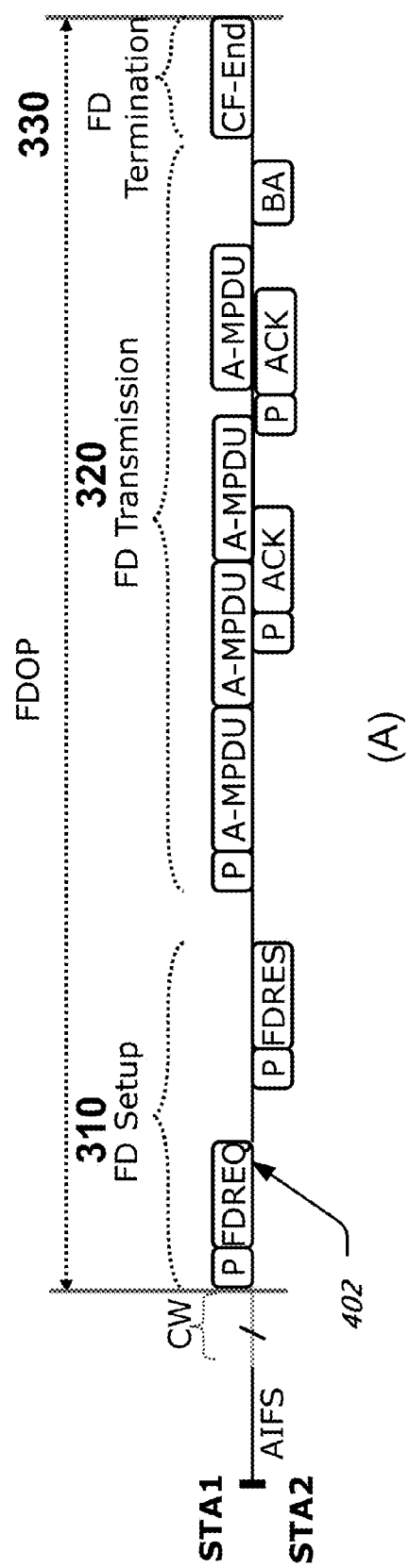
FIG. 4A, FIG. 4B and FIG. 4C show examples of FDOP setup and release mechanisms.

FIG. 4A shows an example timeline for two full-duplex capable stations STA1 and STA2 using FDOP request (FD-REQ) and FDOP response (FD-RES) frames to setup and release full-duplex transmissions. The transmissions performed by STA1 are depicted above the timeline 402 and along the time axis the transmissions performed by STA2 are depicted below the timeline 402. The notation "P" stands for preamble. The abbreviation "A-MPDU" represents an Aggregated MAC Protocol Data Unit. The abbreviation BA represents the last acknowledgement message. Using these messages, the full-duplex capable STAs can set up full duplex transmission opportunities using a half-duplex mechanism that is backward compatible with legacy stations.

Figure 4B:
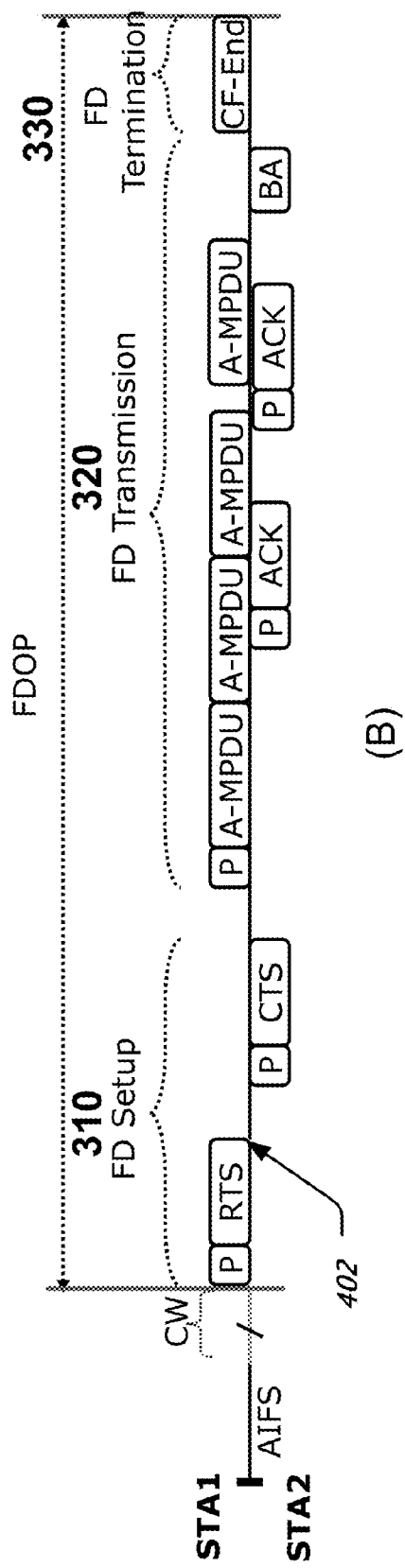

FIG. 4B shows an example of using RTS/CTS to setup and release the full-duplex transmission period, i.e. FDOP. Existing messages, e.g., request to send (RTS) and clear to send (CTS) that are understood by legacy stations, are used to set up FD transmission opportunities.

Figure 4C:
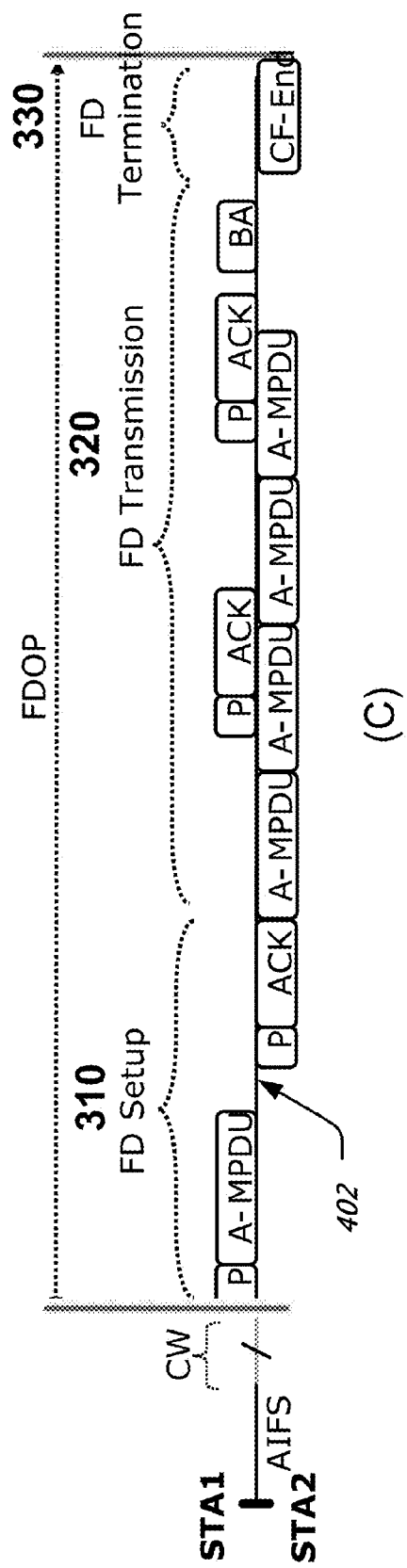

FIG. 4C shows an example of two full-duplex capable stations to establish the full-duplex transmission FDOP in implicit way. The full-duplex transmission is achieved by sending full-duplex data along with an indication. For example, in some embodiments, a physical layer indication, e.g., using one of the reserved fields in the PHY header, may be used to indicate the full duplex transmission. This indication may be ignored by legacy stations, but may be understood by FD compatible nodes. In some embodiments, an indication of the total estimated data transmission (length or duration) may be provided. In some embodiments, an FD STA could convert a part of its normal TXOP into a FDOP, e.g., the FD STA obtains a TXOP by transmitting data to a legacy STA and then transmitting data to a FD STA supporting FDOP within the rest time of the TXOP, thereby implicitly establishing FD transmission.

Example FDOP Setup Procedures

FDOP setup is to provide a fair way for all the contention based stations to acquire the medium for data transmissions. Since signals in full-duplex transmission may not be able to decode by third party stations, it may be beneficial to use half-duplex transmission mechanism to acquire FDOP and notify medium occupancy status to all the other surrounding stations.

In some embodiments, the following operations may be performed to set up FD transmission opportunities.

1) The full-duplex capable station STA1 (FDOP initiator) senses the medium in idle and backs off a certain time called contention window (CW) before entering contention period via sending a FDOP request frame. The FDOP request frame could be a RTS or an A-MPDU frame or a new type of control frame to request the medium occupation. The FDOP request frame includes the capability indication of full-duplex transmission (which may include one bit indication in PHY header or in other format), the total estimated data transmission duration (T1) including ACK time with required IFS time and/or other information such as radio calibration parameters for the full duplex transmission. The full-duplex indication could be used to indicate the capability of FDOP initiator and request to setup full-duplex transmission FDOP. In addition, a full-duplex station may initiate the normal TXOP for half-duplex transmission using RTS or A MPDU frame, and then switch to FDOP for full-duplex transmission within the TXOP.

2) After receiving a FDOP request frame, a full-duplex capable station (FDOP responder) STA2 sends a FDOP response frame. The FDOP response frame could be a CTS or ACK or a new type of control frame which includes the capability indication of full-duplex transmission. The full-duplex indication could be used to indicate its capability and confirm the full-duplex transmission request. The FDOP responder station STA2 includes the estimated total FDOP duration T in the FDOP response frame. The estimated FDOP duration T should be calculated and set to MAX (T1, T2), where T1 is the received estimated transmission time required by STA1, and T2 is the estimated transmission time required by STA2 including data frame time and ACK time with required IFS time plus a FDOP confirmation frame time and CF-End time with required IFS, if desired.

3) After receiving an FDOP response frame with confirmation of establishing full-duplex transmission, the FDOP initiator derives the FDOP duration T from the FDOP response frame. It may send a FDOP confirmation frame (not shown in the drawings) if the FDOP duration T in the FDOP response frame is greater than its estimated transmission time (T1). The FDOP confirmation frame may include the FDOP duration T so that the third party stations around the FDOP initiator would be able to update Network Allocation Vector (NAV) based on the FDOP duration T. If T is equal to T1, the FDOP initiator may not send a FDOP confirmation frame. Then the following transmission time will belong to the full-duplex transmission period that will be used by the pair of full-duplex capable stations to start simultaneous transmissions in the SIFS time after the end of the FDOP response (or FDOP confirmation) frame. Other stations than the communicating full-duplex stations STA1 and STA2 can obtain the FDOP duration T from the FDOP response (or FDOP confirmation) frame and determine the next contention period after the coming FDOP.

Example Full-Duplex Transmission Procedures

In FDOP, data transmissions from the two full-duplex capable stations could be independent to each other. Either of full-duplex stations can start transmitting data frames. A full-duplex station may set More Data="1" of a data frame to indicate there is more frame to be sent.

The FDOP initiator station may set the Duration field of data frame to the time for the remaining data packets to be sent. Similarly the FDOP responder station may set the Duration field of data frame to the time for the remaining data packets to be sent. The Duration information could be able to be decoded and used by its peer communicating station for transmission time estimation, but may not be able to be decoded by third party stations.

In a FDOP period, communicating full-duplex stations may re-transmit data frames if they do not receive ACK frame (or receive a NACK frame). Retransmitted frames may increase the actual duration of FDOP. In the retransmitted data frame, the full-duplex station may set Duration field to indicate the remaining time of transmission. The communicating full-duplex stations calculate the new duration of FDOP based on the updated Duration information and update the FDOP accordingly. The new duration of FDOP may not go over the FDOP duration limit.

If third party stations can receive and decode the FDOP Duration update information, they could update their NAV values accordingly. Otherwise, if third party stations may not be able to receive and/or decode the change of Duration field in retransmitted data frames, they may reset NAVs at the expiration of NAV timers and may start sensing the medium.

In FDOP, two full-duplex communicating stations can transmit data frames to each other simultaneously. This could cause the data frames being mixed over the air may not be able to decode by the third party stations. If third party stations that miss the frame exchanges during the FDOP setup and cannot correct sense the medium being used, they may contend it.

To prevent from FDOP to be collided by third party stations, a clear channel assessment (CCA) dual correlated energy detection (CCA-DCED) mechanism can be used for detecting data frame transmission in FDOP.

Figure 5A:
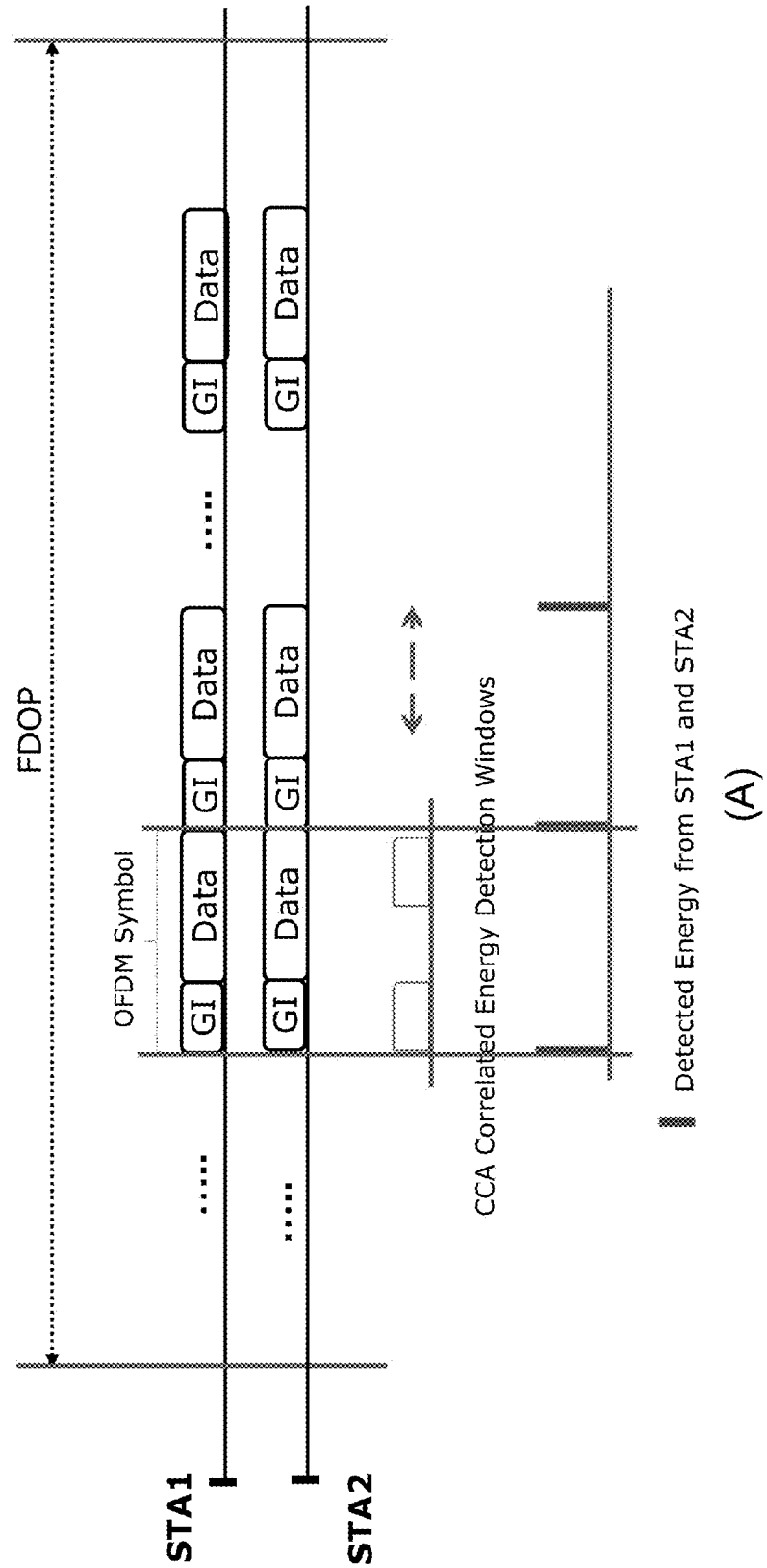
FIG. 5A and FIG. 5B show examples of CCA dual correlated energy detection mechanism for simultaneous full-duplex transmissions.

FIG. 5A shows an example of CCA dual auto-correlated energy detection for full-duplex data transmission in synchronization mode.

Figure 5B:
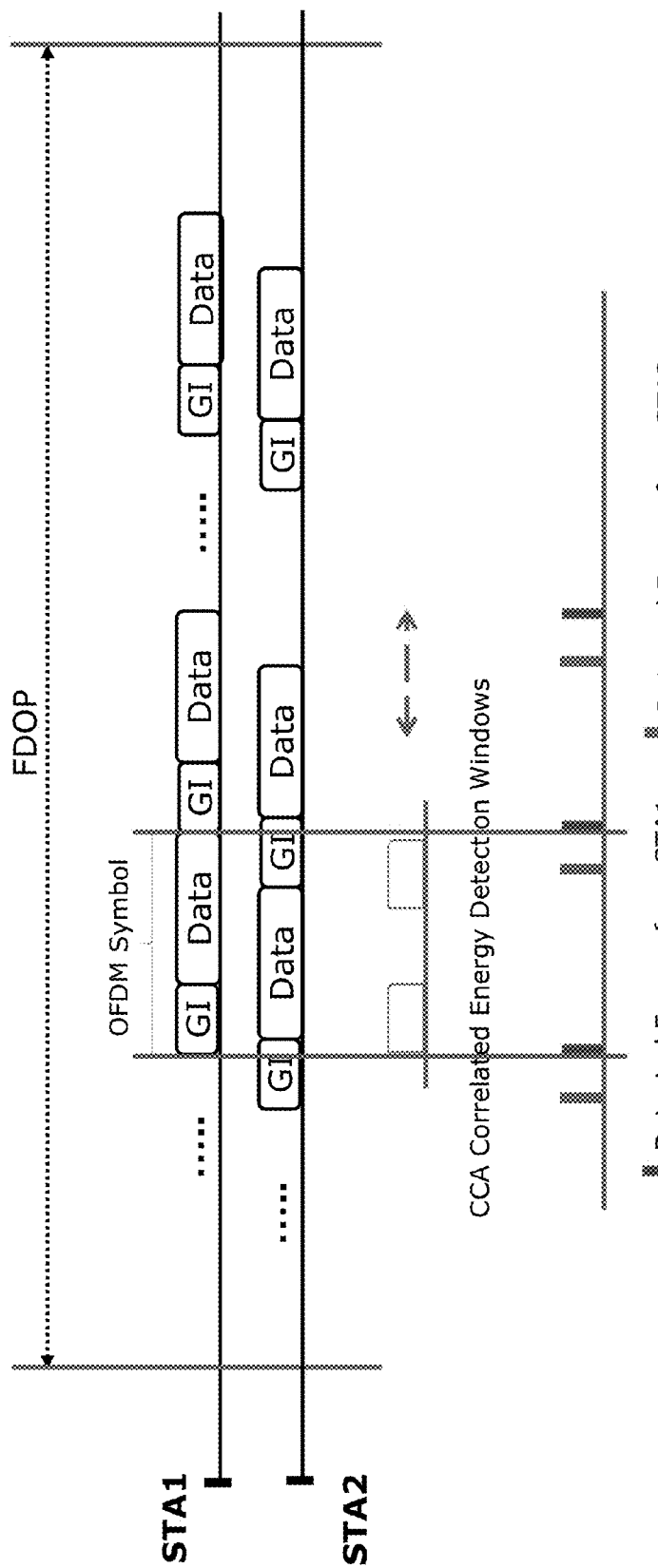

FIG. 5B shows an example of CCA dual auto-correlated energy detection for full-duplex transmissions in asynchronous mode.

Figure 5C:
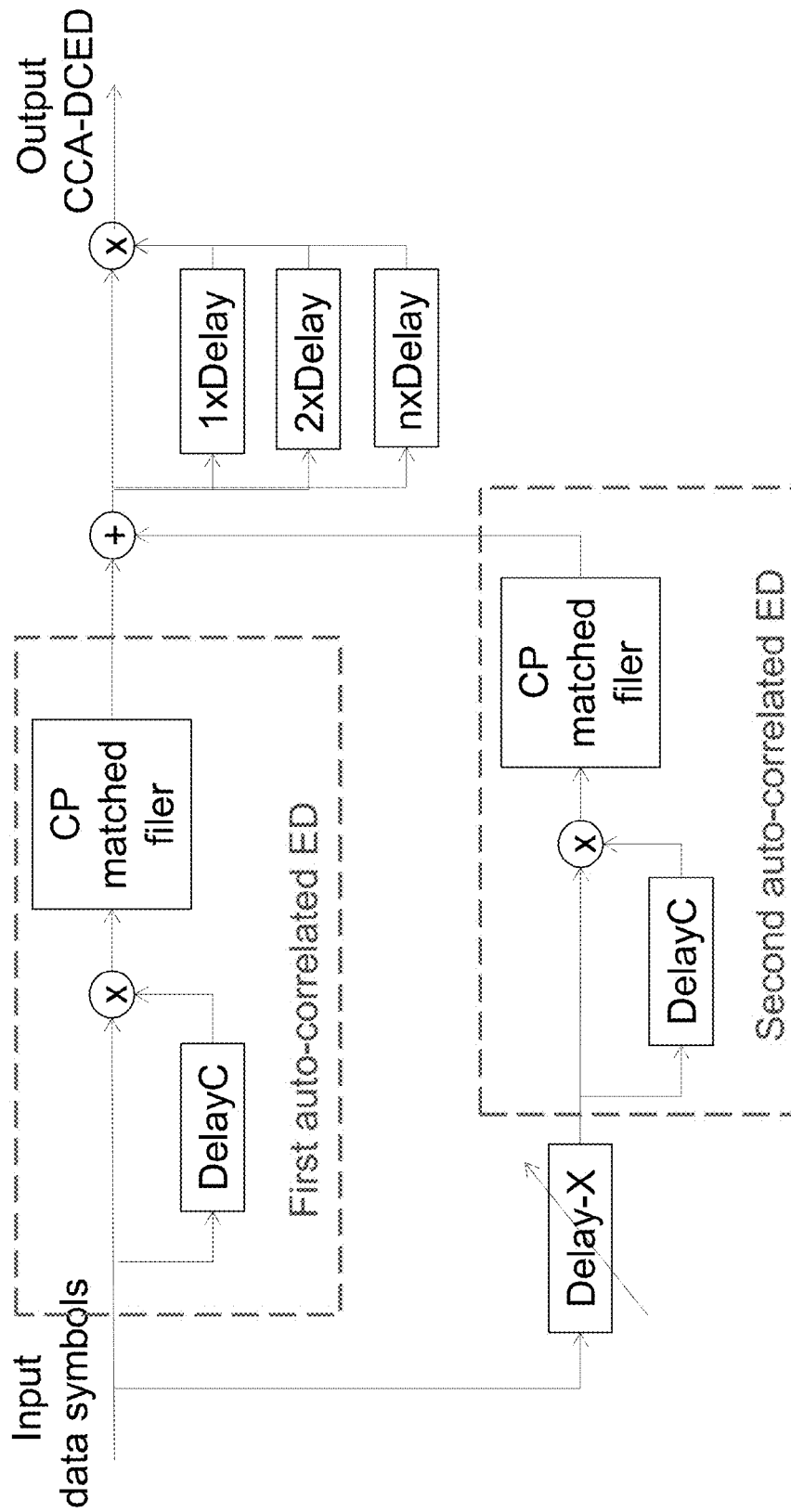
FIG. 5C is a block diagram representation of an example of a CCA dual correlated energy detector.

FIG. 5C shows an example block diagram for CCA dual auto-correlated energy detection of full-duplex transmissions.

A data frame typically maps to a sequence of OFDM symbols. An OFDM symbol consists of a Guard Interval (GI) and data portion of signal. The GI is formed by Cyclic Prefix (CP) from the end of data signal. The CCA dual correlated energy detection mechanism is to correlate signals in two correlated energy detection windows. These two correlated energy detection windows, each of them is $T_{GI}$ long (duration of the guard interval), are separated within an OFDM symbol duration at the beginning and the end of OFDM symbol period in time domain. The CCA-DCED mechanism is to correlate the received signal in the first CCA-DCED window with the second CCA-DCED window, while received data sequence is fed into the CCA-DCED detector. When an OFDM symbol of the data sequence just falls in CCA-DCED windows, the CCA-DCED will have a high energy output because the CP signal is highly correlated with the last part of OFDM symbol. CCA-DCED can detect one peak with higher energy in an OFDM symbol duration, as shown in FIG. 5A if simultaneous full-duplex transmissions are synchronized in symbol level, If simultaneous full-duplex transmissions are asynchronous, the CCA-DCED may detect two peaks with relative lower energy in an OFDM symbol duration as shown in FIG. 5B. If the CCA-DCED detector periodically outputs high energy indication as receiving OFDM signals, the CCA-DCED detector will confirm the medium being used for OFDM based transmissions.

FIG. 5C shows an example electric circuit used for CCA dual auto-correlated energy detection. The Delay is a delay line with the delay value of one OFDM symbol duration. The DelayC is a delay line with delay value of:

$$\text{Delay value} = \text{OFDM symbol time} - \text{CP duration}. \quad \text{Eq. (3)}$$

Delay-X is a delay line with variable delay value. 1×Delay is a delay link with one OFDM symbol delay. n×Delay is a delay with "n" OFDM symbols' duration.

The input OFDM data stream is fed into the CCA-DCED. The auto-correlated energy detector performs the auto-correlated energy detection on the CP portion of the data symbol and outputs the detected energy from the CP matched filter.

The Delay-X delays the input data stream and feeds into the second auto-collected energy detector. The second auto-correlated energy detector performs the auto-correlated energy detection and outputs the detected energy from the CP matched filter. The first and second detected energy signals are added up and sent to the post-processor with different length of delay lines. Adjusting the Delay-X could make the first and second detected energy signals to align up and form one higher energy peak periodically.

Example FDOP Termination Procedures

FDOP could be terminated in two possible ways using signal hand-shaking:

A) One-way termination procedure: as shown FIGS. 4(A), (B) and (C), the last ACK (or BA) frame could be used to indicate the end of full-duplex transmission when the last ACK (or BA) frame contains the field of More Data="0".

For example, a full-duplex station may use the More-Data field to indicate whether there is more frames coming or not. A full-duplex station may set the More Data=0 of the last data frame to indicate no more data to be sent after this data frame within the FDOP. When a full-duplex station receives the last data frame with More Data=0, it may send an ACK (or BA) frame to confirm acceptance of the last data frame. If the full duplex station receiving the last data frame does not have any data to send, it may set More Data=0 in the ACK frame to indicate the end of full-duplex transmission. This ACK frame with More Data=0 is the last ACK (or BA) frame indicating full-duplex stations will not send any frame after the last ACK frame. The full-duplex station sending the last ACK frame may include the remaining Duration information of FDOP.

The CF-End frame could be used as another way to terminate the FDOP, and is used for third party stations to reset NAV and prepare to contend the medium. When the peer full-duplex station receives the last ACK frame, it could transmit the CF-End frame with Duration="0" to confirm the FDOP release so that other stations would be able to contend the medium in a fair way.

The stations that may not be able to hear the last ACK or CF-End frame could calculate the end of FDOP based on their NAV timers and reset NAV when their timers expire.

B) Two-way termination procedure: both full-duplex stations can transmit a CF-End frame to release the current FDOP.

The two-way explicit FDOP release procedure may be necessary and used during two-way simultaneous transmissions.

Figure 6:
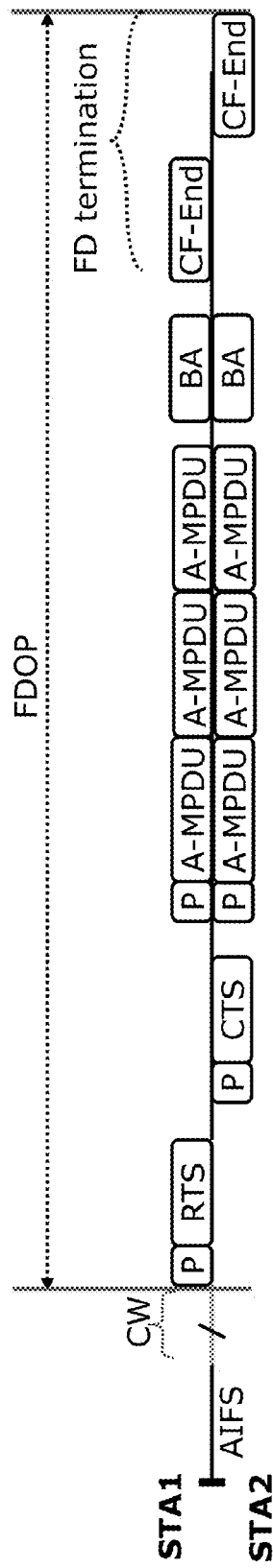
FIG. 6 shows an example of FDOP explicit two-way termination.

FIG. 6 shows an example of procedure for terminating FDOP via an two-way explicit hand-shaking.

1) The full-duplex station STA1 send the last data frame with More Data="0". Meanwhile the peer full-duplex station STA2 sets the field More Data="0" in its last data frame and sends to STA1.

2) When STA2 receives the last data frame with More Data="0" from STA1, it may send to STA1 the last BA frame with More Data="0". At the same time, STA1 receives the last data frame with More Data="0" from STA2, STA1 may send to STA2 a BA frame with More Data="0".

3) When the last ACK (or BA) are received by both stations STA1 and STA2 at the same time, the FDOP holder station may transmit the CF-End frame with More Data=0 to indicate to release the current FDOP. The FDOP holder station may set the Duration field of CF-End frame to the CF-End transmission time with required SIFS time for the two-way FDOP release procedure.

If AP is one of communicating stations in FDOP; it may send a CF-End frame with More Data=0 and appropriate Duration for two-way FDOP release when the AP receives the last ACK (or BA) frame with More Data=0.

4) Since both last ACK (or BA) frames from STA1 and STA2 are transmitting at same time, some third party stations may not be able to receive or decode the last ACK (or BA) frames and aware of the end of current FDOP. Therefore an one-way CF-End frame transmission may cause some un-fairness to those stations in contending medium.

To avoid this unfairness, the peer full-duplex station may send a CF-End frame with More Data="0" and Duration="0" to confirm receiving CF-End from the FDOP holder station (or AP) for release of FDOP.

Figure 7:
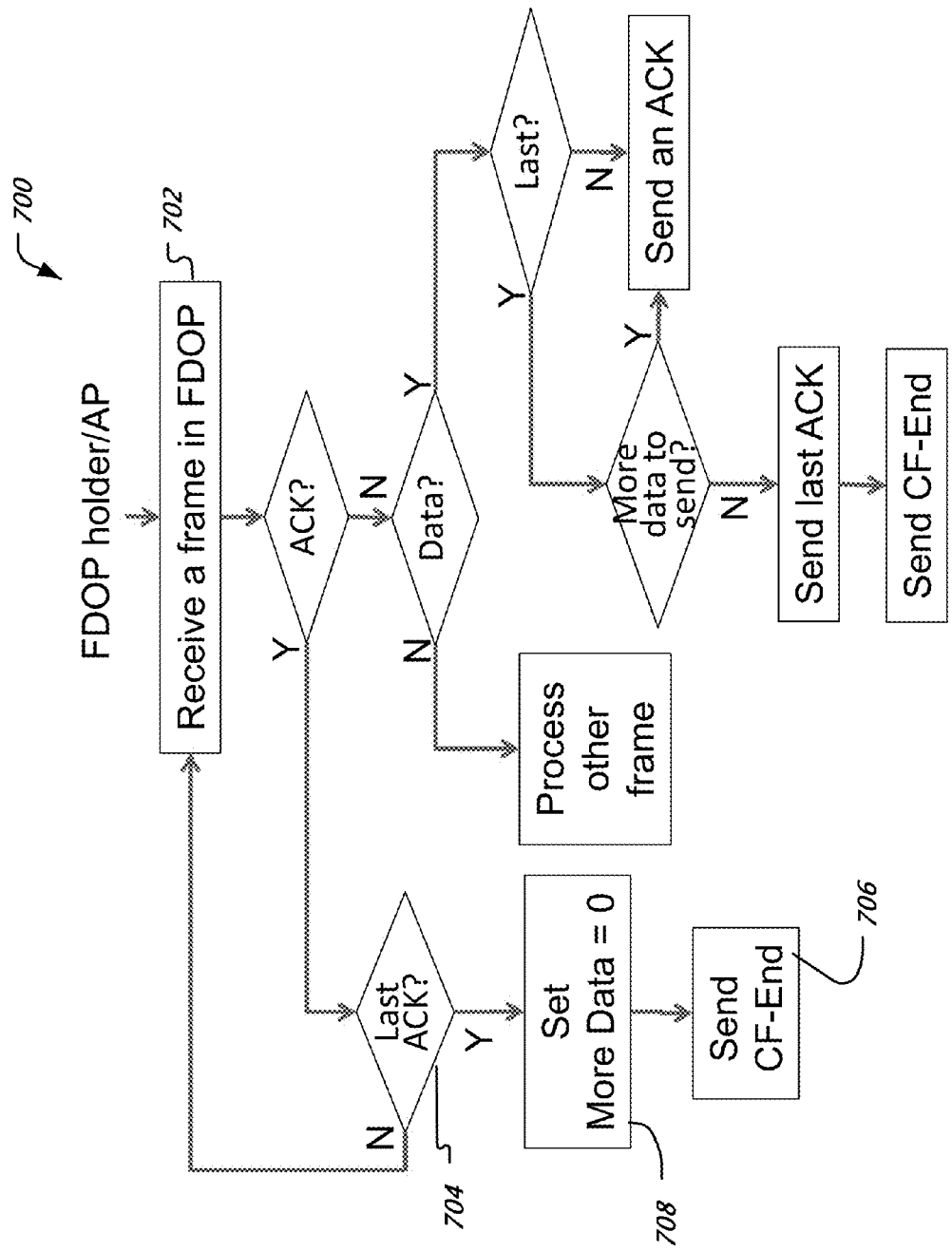
FIG. 7 is a flowchart representation of an example of FDOP termination procedure for FDOP holder or AP.

FIG. 7 shows an example of procedure 700 for terminating FDOP by FDOP holder or AP. When either FDOP holder station or the full-duplex AP receives (702) the last ACK frame (704), it may send (706) a CF-End frame with More Data="0" (708) to start releasing the current FDOP.

If the peer full-duplex station was sending the last ACK frame while receiving the last ACK frame from the FDOP holder station (or AP), it may send a CF-End confirmation frame with Duration="0" to confirm the FDOP release in a half-duplex transmission after receiving a CF-End from FDOP holder station (or AP).

During full-duplex transmission, if the last data frame transmission goes beyond the FDOP duration limitation, either FDOP initiator or responder station may not be necessary to send CF-End frame to release FDOP after the last data frame is acknowledged. The FDOP will be automatically released after the current full-duplex transmission is completed.

Figure 8:
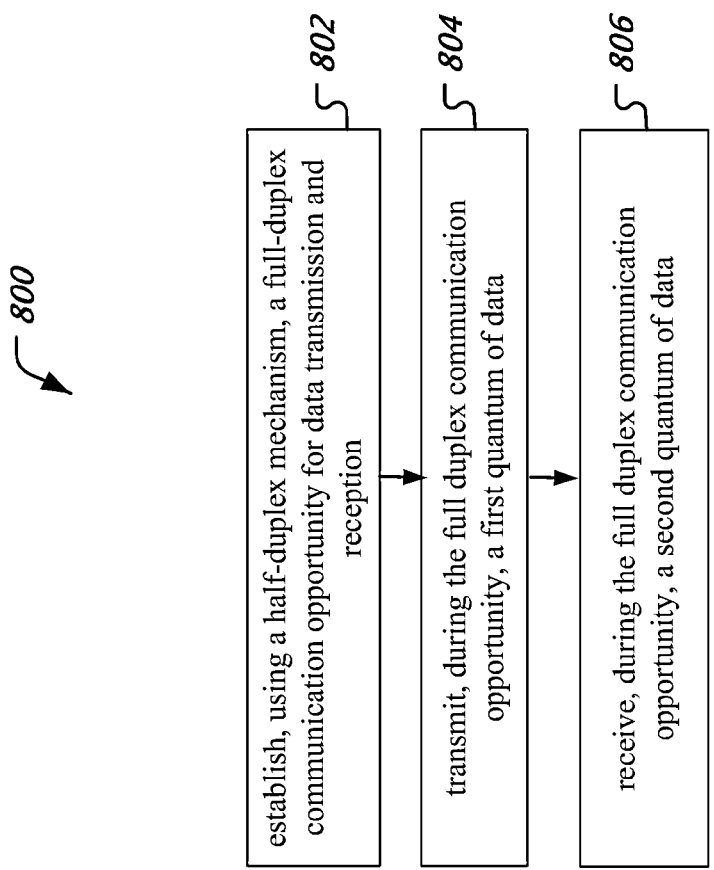
FIG. 8 is a flowchart representation of an example of a wireless communication method.
Figure 9:
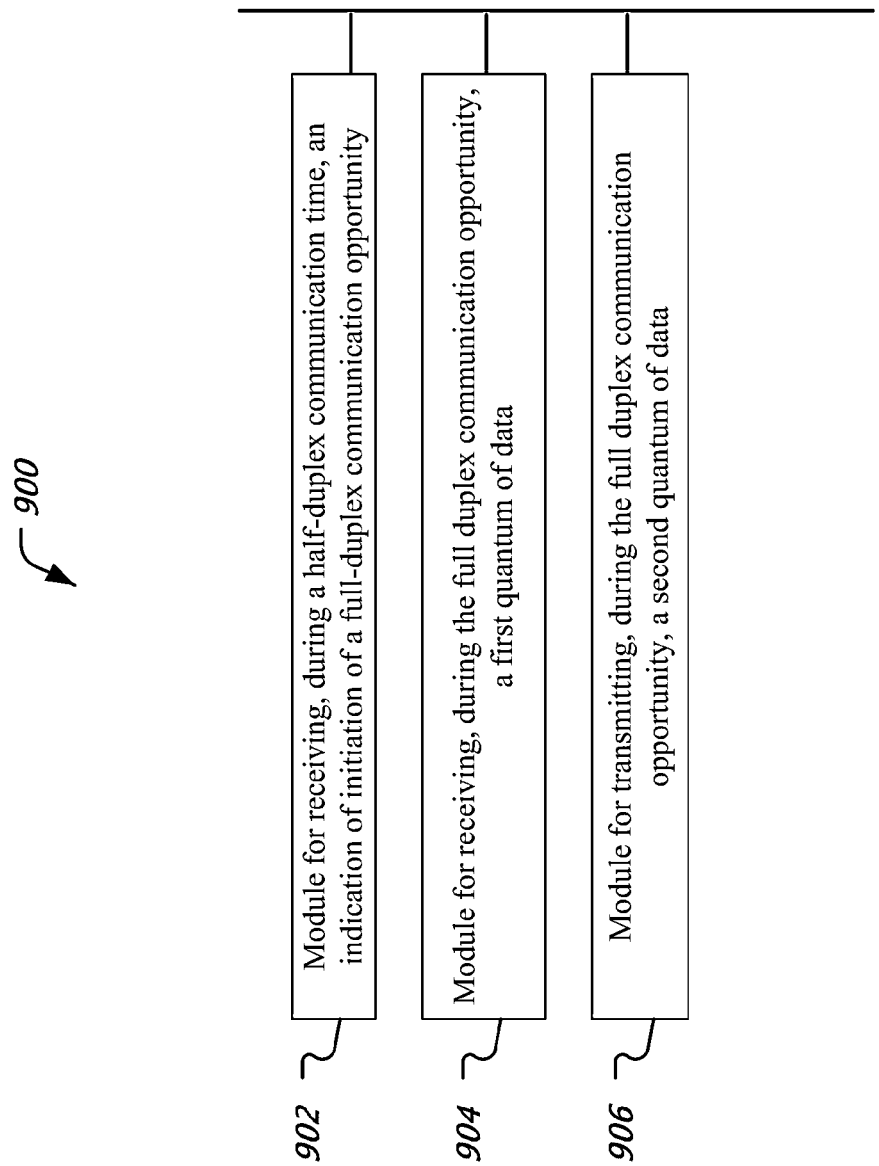
FIG. 9 is a block diagram representation of an example wireless communication apparatus.

FIG. 8 is a flowchart representation of an example process 800 of wireless communication. The process may be implemented at STA1, or the initiator of full duplex communication.

At 802, the process 800 establishes, using a half-duplex mechanism, a full-duplex communication opportunity for data transmission and reception. In some embodiments, the above-described method (e.g., FIG. 3) may be used. A half-duplex mechanism, as an example, may be implemented such that two communicating stations communicating with each other via a downlink channel (from the first station to the second station) and an uplink channel (from the second station to the first station) do not transmit downlink and uplink signals at same time over the same frequency channel, whereas in a full-duplex mechanism, uplink and downlink transmissions could occur at the same time and on the same frequency channel.

At 804, the process 800 transmits, during the full duplex communication opportunity, a first quantum or amount of data. In some embodiments, the first quantum of data may include user layer (application layer) data. In some embodiments, control data may be transmitted.

At 806, the process 800 receives, during the full duplex communication opportunity, a second quantum of data, e.g., user and/or control data from another station including possibly an access point, in the network.

In some embodiments, the process 800 may terminate the full duplex opportunity by explicitly transmitting a message indicating the termination. In some embodiments, the indication of termination of full duplex operation may be transmitted along with full duplex data transmission.

In some embodiments, a method of facilitating full-duplex wireless communication includes receiving, during a half-duplex communication time, an indication of initiation of a full-duplex communication opportunity, receiving, during the full duplex communication opportunity, a first quantum of data, and transmitting, during the full duplex communication opportunity, a second quantum of data.

Figure 10:
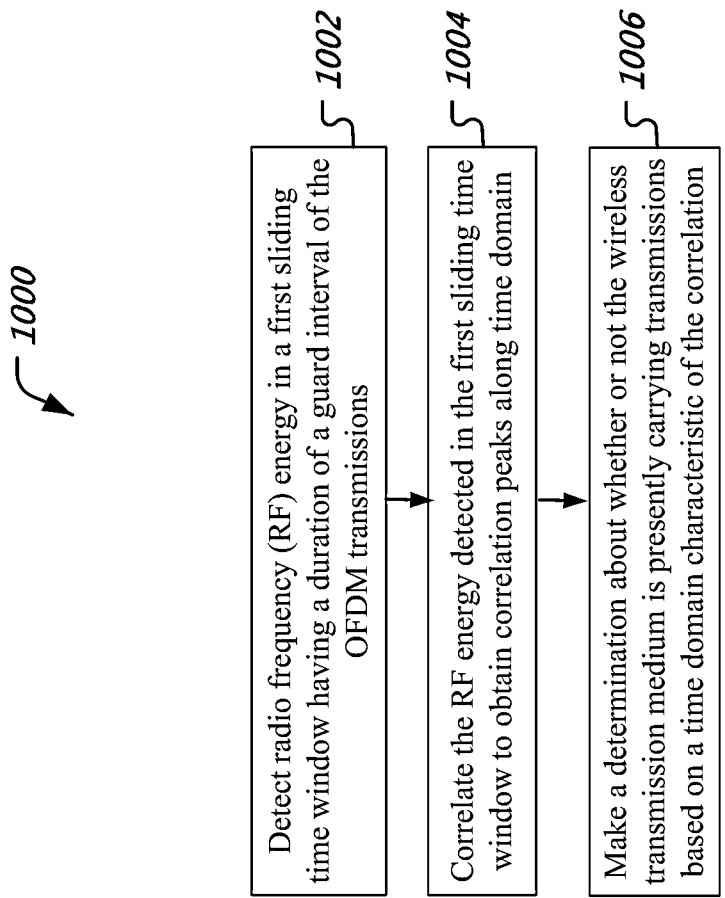
FIG. 10 depicts an example flowchart of a method 1000 of detecting orthogonal frequency division multiplexed (OFDM) transmissions on a wireless transmission medium.

FIG. 10 depicts an example flowchart of a method 1000 of detecting orthogonal frequency division multiplexed (OFDM) transmissions on a wireless transmission medium. The method 1000 includes detecting (1002) radio frequency (RF) energy in a first sliding time window having a duration of a guard interval of the OFDM transmissions, correlating (1004) the RF energy detected in the first sliding time window to obtain correlation peaks along time domain, and making determination (1006) about whether or not the wireless transmission medium is presently carrying transmissions based on a time domain characteristic of the correlation.

In some embodiments, the time window may be selected to be at least equal to the guard interval. In some embodiments, the time window may be within a given tolerance of the nominal guard interval value specified for the protocol being implemented (e.g., 802.11). The tolerance may be, e.g., proportional to the signal to noise ratio of the channel. Some examples of energy detection and auto-correlation determination are described with respect to FIGS. 5A, 5B and 5C.

In some embodiments, the determination 1006 is made that a synchronized mode transmission is being performed when the correlation exhibits peaks having periodicity substantially equal to a symbol periodicity of the OFDM transmissions. In some embodiments, when the correlation exhibits peaks having periodicity substantially different from a symbol periodicity of the OFDM transmissions, a determination is made that an asynchronous mode transmission is being performed (e.g., when stations at two ends of a full duplex communication start their physical layer bursts at times different from that of each other).

In some embodiments, an apparatus for detecting full duplex transmissions on a wireless communication medium includes a module for autocorrelating a stream of data symbols as a first function of time, a module for autocorrelating a delayed version of the stream of symbols as a second function of time, a module for adding one or more delayed versions of a first autocorrelation result output from the first autocorrelation detector and a second autocorrelation result output from the second autocorrelation detector to provide a signal detection output and a module for deciding whether or not a full duplex transmission is taking place on the medium based on the signal detection output. In some embodiments, the autocorrelating modules may be implemented in an analog circuit by using a delay line, a signal multiplier and a signal accumulator, e.g., a capacitive element. In some embodiments, the autocorrelation may be determined in the digital domain by first generating digital samples of the stream of data symbols, then multiplying signals using a processor or a dedicated hardware module and summing up the results of the multiplication to arrive at the autocorrelation value. In some embodiments, the module for adding may be implemented using circuitry for adding analog signals. Alternatively, the module for adding may be embodied digitally using a processor or a circuit for adding numbers or digital values. In some embodiments, the module for deciding may be implemented using a processor. A determination may be made that full duplex transmission is taking place when the signal detection output is above a threshold.

The present document discloses several techniques for achieving full duplex wireless transmissions. In one advantageous aspect, full duplex transmissions may be performed in a wireless network that includes at least some half duplex stations. The full duplex transmission is established in a manner that is compatible with the half duplex ("legacy") stations.

It will further be appreciated that methods for sensing the medium to determine presence/absence of full duplex transmissions are disclosed. In some embodiments, the periodicity of OFDM symbol transmissions and the knowledge that cyclic prefix is repeated at the beginning and the end of the OFDM symbol burst are used to detect transmissions by using autocorrelation with respect to the CP signal.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of facilitating full duplex communication over a shared wireless communication medium, comprising:
   backing off from the shared wireless communication medium for a time period equivalent to a contention window;
   entering, by transmitting a full-duplex transmission request that includes an indication of full-duplex communication capability and an estimated full-duplex transmission duration in the transmission period, a contention period obtained by a division of a medium occupancy time of the shared wireless communication medium into the contention period and a transmission period, wherein the division is compatible with a half-duplex transmission mechanism and the indication of full-duplex communication capability is ignored by half-duplex communication nodes for backward compatibility;

receiving a full-duplex transmission response that includes a full-duplex transmission period determined based on the estimated full-duplex transmission duration;

establishing a full-duplex communication opportunity within the full-duplex transmission period for data transmission and reception; and transmitting, during the full duplex communication opportunity, a first quantum of data; and receiving, during the full duplex communication opportunity, a second quantum of data.

2. The method of claim 1, further comprising:
terminating, after completion of the data transmission and reception, the full duplex communication opportunity.

3. The method of claim 1, wherein the establishing comprises:
transmitting the first quantum of data along with an indication of full-duplex operation.

4. The method of claim 3, further including:
transmitting an acknowledgement message in response to the receiving the second quantum of data.

5. The method of claim 1, wherein the estimated full-duplex transmission duration is determined based on the first quantum of data and the second quantum of data.

6. A method of facilitating full duplex communication over a shared wireless communication medium, comprising:
receiving, during a contention period obtained by a division of a medium occupancy time of the shared wireless communication medium into the contention period and a transmission period, a full-duplex transmission request that includes an indication of full-duplex communication capability and an estimated full-duplex transmission duration in the transmission period, wherein the division is compatible with a half-duplex communication mechanism and the indication of full-duplex communication capability is ignored by half-duplex communication nodes for backward compatibility;

transmitting a full-duplex transmission response that includes a full-duplex transmission period determined based on the estimated full-duplex transmission duration;

establishing a full-duplex communication opportunity within the transmission period for data transmission and reception;

receiving, during the full duplex communication opportunity, a first quantum of data; and transmitting, during the full duplex communication opportunity, a second quantum of data.

7. The method of claim 6, further comprising:
terminating, after completion of the data transmission and reception, the full duplex communication opportunity.

8. The method of claim 6, wherein the establishing comprises:
transmitting the second quantum of data along with an indication of full-duplex operation.

9. The method of claim 8, further including:
transmitting an acknowledgement message in response to the receiving the first quantum of data; and receiving a third quantum of data, wherein the third quantum of data is received at least partially concurrently with the transmission of the acknowledgement message.

10. A wireless communication apparatus, comprising a memory and a processor, wherein the memory stores code and the processor reads the code from the memory and implements a method of full duplex communication by:
backing off from the shared wireless communication medium for a time period equivalent to a contention window;

entering, by transmitting a full-duplex transmission request that includes an indication of full-duplex communication capability, a contention period obtained by a division of a medium occupancy time of the shared wireless communication medium into the contention period and a transmission period, wherein the division is compatible with a half-duplex transmission mechanism and the indication of full-duplex communication capability is ignored by half-duplex communication nodes for backward compatibility;

receiving a full-duplex transmission response that includes a full-duplex transmission period determined based on the estimated full-duplex transmission duration;

establishing a full-duplex communication opportunity within the full-duplex transmission period for data transmission and reception; and transmitting, during the full duplex communication opportunity, a first quantum of data; and receiving, during the full duplex communication opportunity, a second quantum of data.

11. A computer program product comprising a non-transitory computer readable storage medium on which computer-executable instructions are stored, the instructions comprising:
instructions for receiving, during a contention period obtained by a division of a medium occupancy time of the shared wireless communication medium into the contention period and a transmission period, a full-duplex transmission request that includes an indication of full-duplex communication capability and an estimated full-duplex transmission duration in the transmission period, wherein the division is compatible with a half-duplex communication mechanism and the indication of full-duplex communication capability is ignored by half-duplex communication nodes for backward compatibility;

instructions for transmitting a full-duplex transmission response that includes a full-duplex transmission period determined based on the estimated full-duplex transmission duration;

instructions for establishing a full-duplex communication opportunity within the transmission period for data transmission and reception;

instructions for receiving, during the full duplex communication opportunity, a first quantum of data; and instructions for transmitting, during the full duplex communication opportunity, a second quantum of data.

12. The computer program product of claim 11, wherein the instructions further include:
instructions for estimating a duration of the full-duplex communication opportunity; and instructions for transmitting a message indicative of the duration.

13. The method of claim 1, wherein the full-duplex transmission request is a full-duplex transmission opportunity (FDOP) request frame to request occupation of the shared wireless communication medium.

14. The method of claim 13, wherein the FDOP request frame is a request to send (RTS) frame.

15. The method of claim 13, wherein the FDOP request frame is an Aggregated MAC Protocol Data Unit (A-MPDU) frame.

16. The method of claim 1, wherein the full-duplex transmission response is an FDOP response frame.

17. The method of 16, wherein the FDOP response frame is a clear to send (CTS) frame.

18. The method of 16, wherein the FDOP response frame is an acknowledgement (ACK) frame.

19. The method of claim 1, wherein the full-duplex transmission request is a full-duplex transmission opportunity (FDOP) request frame to request occupation of the shared wireless communication medium.

20. The method of claim 19, wherein the FDOP request frame is a request to send (RTS) frame.

21. The method of claim 19, wherein the FDOP request frame is an Aggregated MAC Protocol Data Unit (A-MPDU) frame.

22. The method of claim 6, wherein the full-duplex transmission response is an FDOP response frame.

23. The method of 22, wherein the FDOP response frame is a clear to send (CTS) frame.

24. The method of 22, wherein the FDOP response frame is an acknowledgement (ACK) frame.

* * * * *